(12) United States Patent
Singh et al.

(10) Patent No.: US 11,061,729 B2
(45) Date of Patent: Jul. 13, 2021

(54) THROTTLING LOGGING PROCESSES

(71) Applicant: Nutanix, Inc., San Jose, CA (US)

(72) Inventors: Bhawani Singh, Bangalore (IN);
Rachit Sinha, Bangalore (IN);
Buchibabu Chennupati, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 102 days.

(21) Appl. No.: 16/120,121

(22) Filed: Aug. 31, 2018

(65) Prior Publication Data
US 2020/0073718 A1   Mar. 5, 2020

(51) Int. Cl.
*G06F 9/46* (2006.01)
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| 8,271,724 | B1* | 9/2012 | Scott ................. G06F 3/061 707/644 |
| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 10,921,872 | B2* | 2/2021 | Gendler .................. G06F 1/324 |
| 2006/0136638 | A1* | 6/2006 | Banning ................. G06F 9/505 710/244 |
| 2009/0006717 | A1* | 1/2009 | Rothman ............... G06F 11/261 711/102 |

OTHER PUBLICATIONS

Cano, I. et al., "Curator: Self-Managing Storage for Enterprise Clusters", *14th USENIX Symposium on Networked Systems Design and Implementation, NSDI '17*, (Mar. 27, 2017).

(Continued)

*Primary Examiner* — Camquy Truong
(74) *Attorney, Agent, or Firm* — Vista IP Law Group, LLP

(57) ABSTRACT

Systems and methods for throttling logging processes in presence of system resource contention. Logging processes that contend with non-logging processes for resources can sometimes be throttled to more equitably share system resources. A method embodiment commences by establishing a set of throttling rules that are to be observed by the logging processes running on the system. While logging processes and non-logging processes are running, a monitor records system resource usage and other system conditions. When a process manager determines that the resources consumed by the combination of the logging processes and the non-logging processes exceed a threshold, then any currently-applicable throttling rules fire so as to prescribe throttling levels. If logging processes are consuming more resources than the prescribed throttling levels permit, then the logging processes are scheduled at lower priorities and/or are subjected to throttling level enforcements that serve to temporarily reduce system resource consumption by the logging processes.

24 Claims, 10 Drawing Sheets

(56) References Cited

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

* cited by examiner

THROTTLING LOGGING PROCESSES

FIELD

This disclosure relates to computing systems, and more particularly to techniques for throttling logging processes.

BACKGROUND

Many modern computing systems include various monitoring and logging functions. For example, computer configuration changes might be monitored and logged such that a previous configuration state could be reconstructed if needed. Or, as another example, input and output (I/O or IO) transactions that are executed over a database might be monitored and logged by a journaling process that logs such transactions into a journal, which journal can facilitate restoring the database to a state associated with a particular point in time.

The logging processes to perform the foregoing operations consume computing resources. In many cases, the computing resources demanded by the logging processes are shared resources that are also demanded by non-logging processes (e.g., workload processes) associated with other workloads running on the computing system. A particular computing system can support many different types of logging processes as well as many different types of workload processes. For example, a single computing node might support logging processes that correspond to IO monitoring, garbage collection, and/or other logging functions, as well as workload processes that correspond to database engines, virtual desktops, and/or other applications. To execute the logging processes and the workload processes over the shared computing resources of the computing system, a process scheduler at the computing system might schedule the processes in the order received, independent of the process type (e.g., logging, non-logging, etc.). As such, during periods of high demand, certain workload processes (e.g., of mission critical applications such as a database engine) might be starved for computing resources at the same time that logging processes are contending for those same computing resources.

Unfortunately, computing resource starvation of workload processes (e.g., of mission critical applications) might persist for a long period of time when logging processes are being carried out. As a result, the applications associated with the starved workload processes can exhibit decreased performance. What is needed is a way for computing resources to be managed such that non-logging processes (e.g., workload processes) are not starved by logging processes.

SUMMARY

The present disclosure describes techniques used in systems, methods, and in computer program products for throttling logging processes, which techniques advance the relevant technologies to address technological issues with legacy approaches. More specifically, the present disclosure describes techniques used in systems, methods, and in computer program products for throttling of logging processes in distributed computing systems. Certain embodiments are directed to technological solutions for scheduling logging processes in accordance with corresponding throttling levels that are determined from the then-current computing system conditions.

The disclosed embodiments modify and improve over legacy approaches. In particular, the herein-disclosed techniques provide technical solutions that address the technical problems attendant to computing resource starvation of non-logging processes due to computing resource consumption by logging processes. Such technical solutions relate to improvements in computer functionality. For example, when logging processes are throttled in favor of non-logging processes, the responsivity of the non-logging processes is improved as compared to responsivity during periods of high demand (e.g., when the logging and non-logging processes have to contend for resources in the absence of throttling.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of hyperconverged computing platform management as well as advances in various technical fields related to computing cluster management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
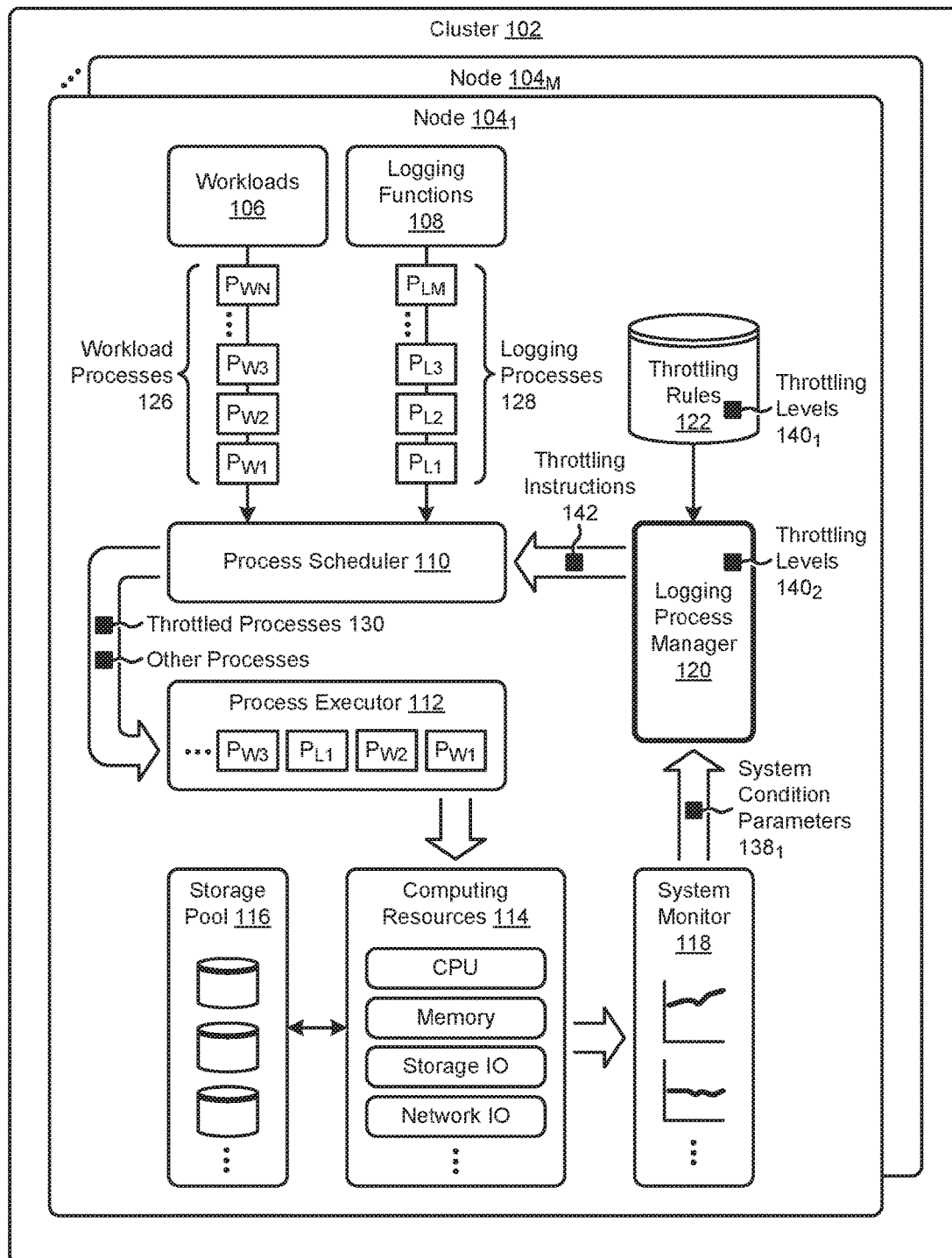
FIG. 1A illustrates a computing environment in which embodiments of the present disclosure can be implemented.

Embodiments in accordance with the present disclosure address the problem of computing resource starvation of non-logging processes due to computing resource consumption by logging processes. Some embodiments are directed to approaches for scheduling logging processes in accordance with corresponding throttling levels that are determined from the then-current computing system conditions. The accompanying figures and discussions herein present example environments, systems, methods, and computer program products for throttling of logging processes in distributed computing systems.

Overview

Disclosed herein are techniques for scheduling logging processes in accordance with corresponding throttling levels that are determined based at least in part on the then-current computing system conditions. In certain embodiments, the system conditions of a computing system are continually measured and recorded. For example, the system conditions might indicate the amount of computing resources (e.g., CPU, memory, storage IO, network bandwidth, etc.) consumed by logging processes and non-logging processes (e.g., workload processes). The system conditions might further indicate certain failures or health modes of the computing system. A set of throttling rules are applied to the then-current system conditions to determine one or more throttling levels to assign to each of the logging processes and/or to the non-logging processes. The logging processes and non-logging processes are then scheduled for execution in accordance with the determined throttling levels. In certain embodiments, tokens and/or priority queues are implemented to facilitate the scheduling of the logging processes and non-logging processes. In certain embodiments, one or more of the foregoing operations are performed at instances of virtualized controllers in a virtualization environment. In certain embodiments, the logging processes and the non-logging processes are invoked by instances of virtualized controllers and virtual machines, respectively.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment 1A00 in which embodiments of the present disclosure can be implemented. As an option, one or more variations of computing environment 1A00 or any aspect thereof may be implemented in the context of the architecture and functionality of the embodiments described herein. The computing environment 1A00 or any aspect thereof may be implemented in any environment.

FIG. 1A illustrates certain aspects pertaining to scheduling logging processes in accordance with corresponding throttling levels that are determined from the then-current computing system conditions. Specifically, the figure presents a logical depiction of how the herein disclosed techniques can be implemented in a computing environment that comprises a multi-node cluster to throttle the logging processes performed at each node in the cluster.

The logical depiction of FIG. 1A illustrates a cluster 102 that comprises multiple nodes (e.g., node $104_1$, . . . , node $104_M$). Any of the nodes in cluster 102, such as node $104_1$, might have various instances of logging functions 108 and workloads 106 that are actively invoking respective sets of processes to carry out certain operations. As can be observed, logging functions 108 might invoke instances of logging processes 128 (e.g., processes "$P_{L1}$", "$P_{L2}$", "$P_{L3}$", . . . , "$P_{LM}$") and workloads 106 might invoke instances of workload processes 126 (e.g., processes "$P_{W1}$", "$P_{W2}$", "$P_{W3}$", . . . , "$P_{WN}$").

A logging process is a set of operations (e.g., job, task, etc.) that is to be executed to carry out some logging function. A workload process is a representative example of a non-logging process, which is a set of operations (e.g., job, task, etc.) that is to be executed to carry out some function other than a logging function. A process scheduler 110 at node $104_1$ schedules the logging processes 128 and the workload processes 126 for execution at node $104_1$ and/or other nodes in cluster 102. The execution of the processes consumes corresponding shares of a set of computing resources 114 available at node $104_1$. As shown, computing resources 114 might comprise "CPU" resources, "Memory" resources, "Storage IO" resources, "Network IO" resources, and/or other resources. Certain processes often access a storage pool 116 available to node 104₁ and/or cluster 102.

As earlier described, situations can arise in which at least some of the workload processes 126 might have a demand for certain portions of computing resources 114 that is not satisfied due at least in part to the consumption of such resources by some or all of the logging processes 128. The herein disclosed techniques address such problems attendant to computing resource starvation of non-logging processes due to computing resource consumption by logging processes. Specifically, the embodiment of FIG. 1A illustrates that such problems can be addressed at least in part by implementing a logging process manager 120 at node $104_1$. The logging process manager 120 receives instances of system condition parameters $138_1$ that are measured and recorded by a system monitor 118 at node $104_1$.

The system condition parameters are a set of parameters that describe the system conditions of a certain portion of a computing system. More specifically, the system condition parameters $138_1$ might comprise various key-value pairs associated with system conditions that pertain to the computing resources 114 of node $104_1$. Specifically, the keys of the key-value pairs might correspond to certain metrics (e.g., percent CPU usage, percent memory usage, storage IO per second, network IO per second, etc.) of the computing resources 114, and the respective values might correspond to the measured observations of those metrics at some moment in time and/or over some time period. The system condition parameters might also comprise objects with attributes that describe system conditions pertaining to certain states associated with the computing system. As an example, system condition parameters that describe the state of a virtual machine (VM) running at node $104_1$ might include a unique identifier of the VM and a string that describes the state (e.g., "running", "stopped", "idle", etc.) of the VM. Instances of system condition parameters $138_1$ are continually captured by system monitor 118 to present the then-current system conditions and/or historical system conditions to logging process manager 120.

A set of throttling rules 122 are applied to the set of system condition parameters $138_1$ that describe the then-current system conditions to determine one or more throttling levels to assign to each of the logging processes 128 and/or to the workload processes 126 and/or to any other non-logging processes. A set of rules (e.g., rule base) such as throttling rules 122, or any other rules described herein, comprises data records storing various information that can be used to form one or more constraints (e.g., throttling levels 140₁) to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. In this case, at least a portion of the operands are derived from the system condition parameters $138_1$. The results produced by applying one or more instances of throttling rules 122 may include one or more determined instances of throttling levels 140₂. A throttling level is a data structure (e.g., programming object) that comprises information that describes attributes that pertain to a throttling mechanism so as to control the throttling that is applied to one or more processes. Such throttling serves to control certain aspects of the execution of a process, which aspects include (1) when the process is executed, (2) the amount of resources consumed by the process over a particular time period, and/or (3) other aspects pertaining to process execution.

A set of throttling instructions 142 that codify the throttling levels determined by logging process manager 120 are issued to process scheduler 110 to facilitate scheduling of logging processes 128 and workload processes 126 according to the herein disclosed techniques. The throttling instructions 142 are messages that are configured to facilitate interpretation by a process scheduler for application of the throttling levels to running processes. As an example, throttling instructions might be passed as a parameter object in a call from logging process manager 120 to process scheduler 110. The process scheduler 110 applies the throttling levels and/or other information from the throttling instructions 142 to the running processes to form a set of throttled processes 130 that are provided to a process executor 112.

As can be observed in the depiction of FIG. 1A, two workload processes (e.g., "$P_{W1}$" and "$P_{W2}$") are in the process executor 112 ahead of the one logging process (e.g., "$P_{L1}$") in the process executor. In this embodiment, the process scheduler and the process executor cooperate to manage resource usage between logging processes and non-logging processes. In this embodiment, the throttling instructions 142 are used to specify that a throttling level is to be applied to the logging processes 128. In other embodiments, the process executor interprets throttling instructions for purposes of assigning priority levels and/or for placing processes into one of a set of priority queues. As such, the portion of computing resources 114 that might have been consumed by other invoked logging processes (e.g., "$P_{L2}$", "$P_{L3}$", etc.) received at process scheduler 110 is available to non-logging processes (e.g., workload processes 126).

The aforementioned logging process throttling capabilities facilitated by the herein disclosed techniques result in improvements in computer functionality that serve to reduce the demand for computer processing power, reduce the demand for computer memory and data storage, reduce network bandwidth use, and reduce the demand for inter-component communication in computing environments. Specifically, applications of the herein disclosed techniques reduce the consumption of computing resources by minimizing or eliminating surplus computing resources that might be allocated in response to the technological problem of oversubscribed shared computing resources by contending logging processes and non-logging processes in certain computing environments (e.g., virtualization environments).

Various logging process throttling scenarios as facilitated by the herein disclosed techniques are disclosed in further detail as follows.

Figure 1B:
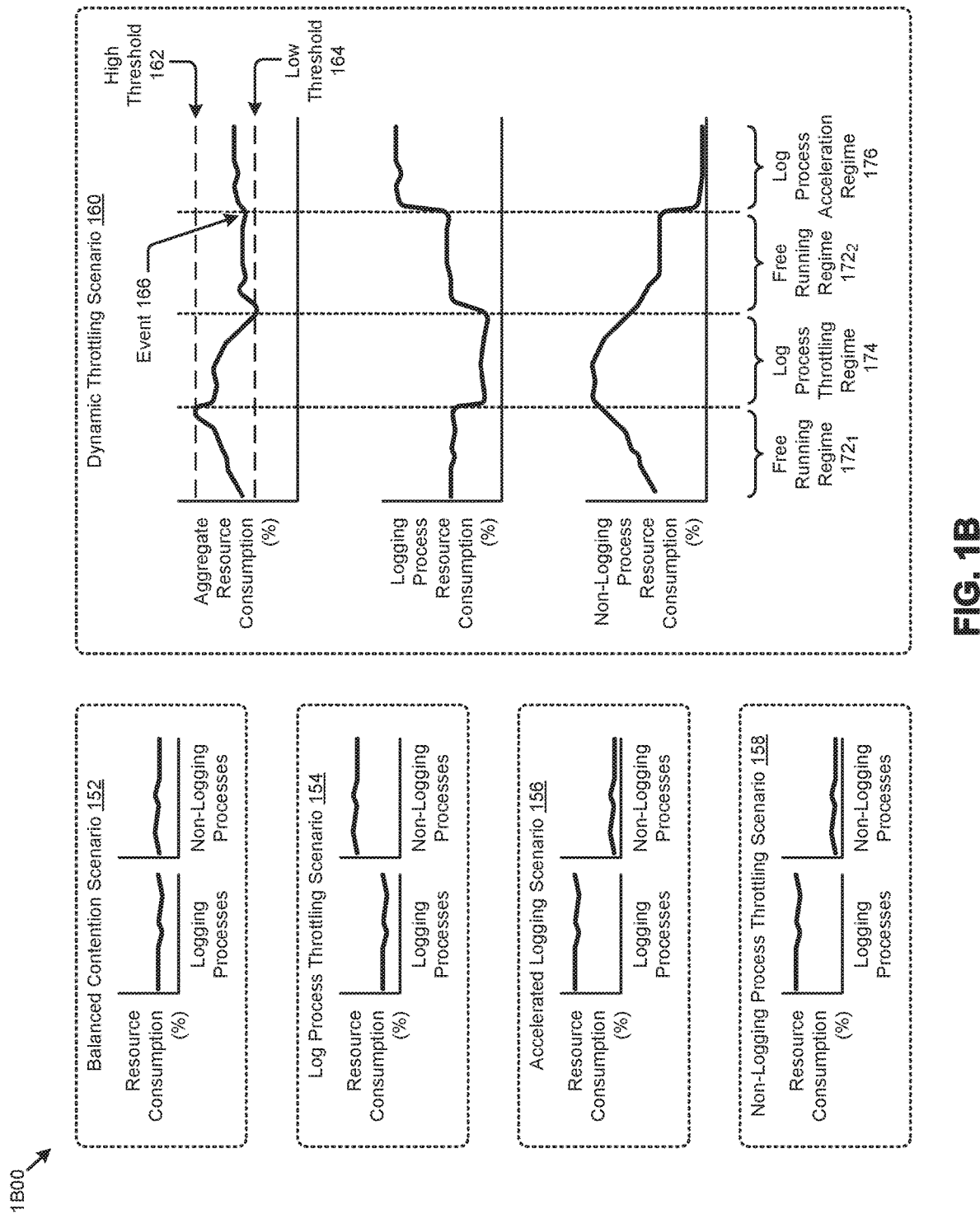
FIG. 1B presents diagrams showing several process throttling scenarios that occur in systems that facilitate throttling of logging and non-logging processes in distributed computing systems, according to an embodiment.

FIG. 1B presents diagrams showing several throttling scenarios 1B00 that occur in systems that facilitate throttling of logging and non-logging processes in distributed computing systems. As an option, one or more variations of the throttling scenarios 1B00 or any aspect thereof may be implemented in the context of the architecture and functionality of the embodiments described herein. The throttling scenarios 1B00 or any aspect thereof may be implemented in any environment.

FIG. 1B illustrates certain aspects pertaining to scheduling processes in accordance with corresponding throttling levels that are determined from the then-current computing system conditions. Specifically, the figure illustrates various scenarios that correspond to the application of certain throttling levels to processes in a computing system. The scenarios are visually represented by graphs of the respective computing resource consumption levels (e.g., in percent of total available resources) by logging processes and non-logging processes that might be exhibited when a certain corresponding throttling level is applied.

As shown in FIG. 1B, a scenario where no throttling or equivalent throttling is applied to both the logging processes and the non-logging processes is illustrated in a balanced contention scenario 152. As can be observed, the respective resource consumption levels exhibited by the logging processes and the non-logging processes are near the same level. In a log process throttling scenario 154, the logging processes are throttled down to a low level of resource consumption such that the non-logging processes are able to consume a higher level of resources. An accelerated logging scenario 156 illustrates a scenario in which the logging processes are prioritized so as to permit a higher resource consumption level associated with the logging processes as compared to a lower resource consumption level associated with the non-logging processes.

Still further scenarios often occur. For example, and as shown in the non-logging process throttling scenario 158, it can happen that one or more relatively more important logging processes are running at a time when one or more relatively less important non-logging processes are contending for resources. In such a scenario, the relatively less important non-logging processes can be throttled. In this scenario, the resource consumption between the logging processes and the non-logging processes might be the same or similar to the resource consumption as depicted in accelerated logging scenario 156, however, in the scenario corresponding to the non-logging process throttling scenario 158, the reason that the non-logging processes are consuming resources at a relatively lower rate is in response to active throttling of one or more of the non-logging processes. Techniques for determining the relative importance of a particular process (e.g., either a logging process or a non-logging process) in the presence of other resource-consuming processes is further discussed as pertains to FIG. 4.

The dynamic throttling scenario 160 illustrates how one or more of the foregoing throttling levels and scenarios might be applied over time according to the herein disclosed techniques. As shown in the left-most region of the graphs of dynamic throttling scenario 160, the resource consumption levels (e.g., as captured by a system monitor) of the logging processes and non-logging processes might execute in a free running regime $172_1$—wherein the processes are able to contend for resources on demand—are executed until such time as a threshold is breached. As such, during execution under the free running regime, no throttling controls are applied to the processes. However, if the aggregate resource consumption breaches a high threshold 162, a log process throttling regime 174 is enforced over logging processes. For example, a rule that serves to enter into a throttling regime might indicate that a throttling level is to be applied if a high threshold value is breached. As can be observed in the graph region corresponding to log process throttling regime 174, the logging processes might then be forced to consume fewer resources, which in turn would permit the non-logging processes to execute at a higher level of resource consumption.

If the aggregate resource consumption decreases such that a low threshold 164 is breached, a free running regime is again entered (e.g., the shown running regime $172_2$) and both the logging processes and non-logging processes share resources on demand. For example, a throttling rule might indicate that any then-current throttling is to be reset to a balanced throttling level (e.g., no throttling) if a particular low threshold value is breached. In some cases, certain events (e.g., event 166) might be detected at the computing system. As an example, event 166 might correspond to a call to migrate one or more VMs from a first node to a second node. In this case, a surge of logging processes might be invoked to facilitate the migration. As such, event 166 might enter a log process acceleration regime 176. As shown in the right-most region of the graphs of dynamic throttling scenario 160, under the log process acceleration regime, the logging processes consume a higher level of resources than is consumed by the non-logging resources.

One embodiment of techniques for applying such throttling levels to logging processes is disclosed in further detail as follows.

Figure 2:
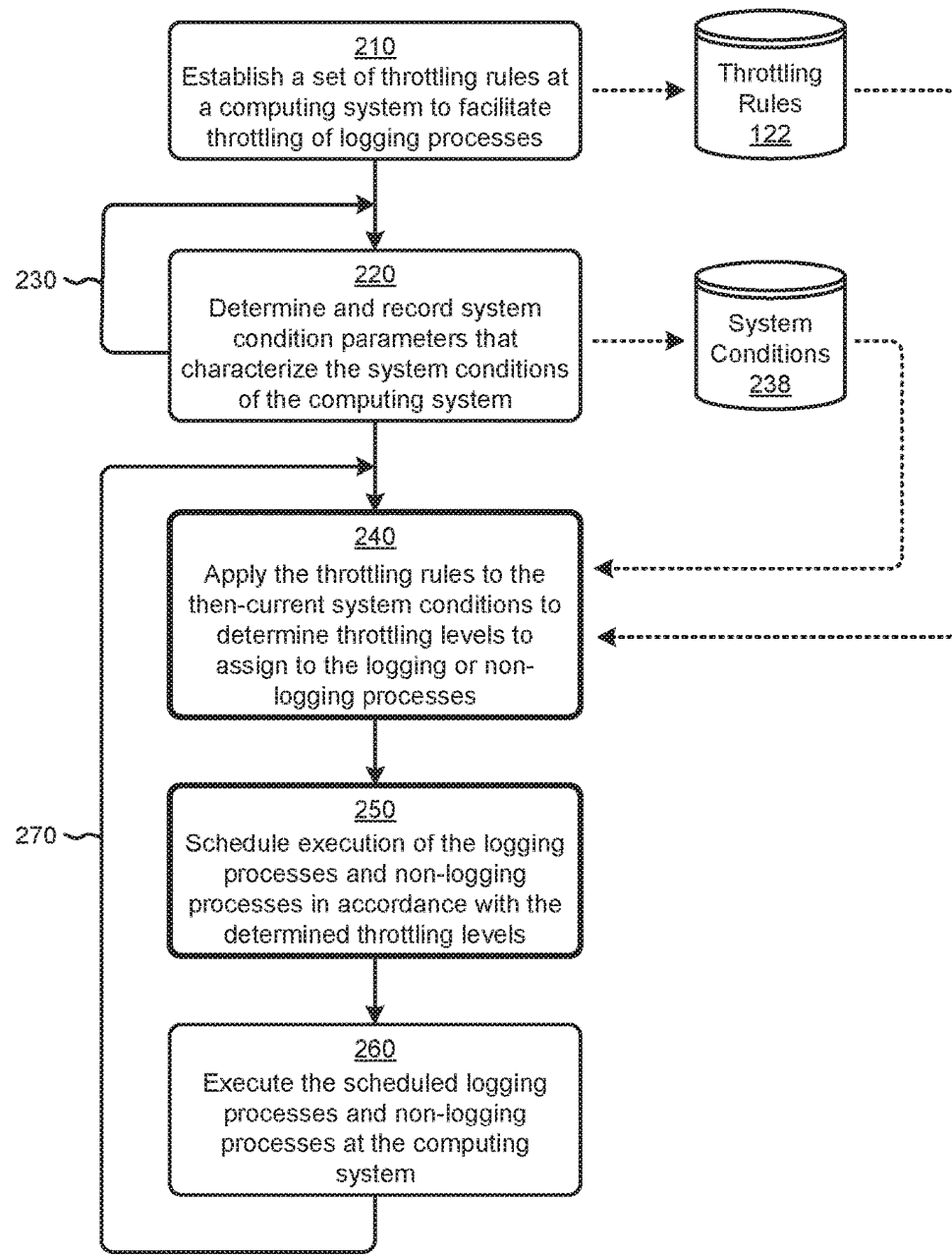
FIG. 2 depicts a logging process throttling technique as implemented in systems that facilitate throttling of logging processes in distributed computing systems, according to an embodiment.

FIG. 2 depicts a process throttling technique 200 as implemented in systems that facilitate throttling of logging processes in distributed computing systems. As an option, one or more variations of process throttling technique 200 or any aspect thereof may be implemented in the context of the architecture and functionality of the embodiments described herein. The process throttling technique 200 or any aspect thereof may be implemented in any environment.

FIG. 2 illustrates certain aspects pertaining to scheduling logging processes in accordance with corresponding throttling levels that are determined from the then-current computing system conditions. Specifically, the figure is presented to illustrate one embodiment of certain steps and/or operations that facilitate throttling of logging processes in distributed computing systems. Certain system components are also depicted in the figure to further describe certain aspects of the process throttling technique 200.

As shown, the process throttling technique 200 can commence by establishing a set of throttling rules at a computing system to facilitate throttling of logging processes (step 210). The set of throttling rules might be the throttling rules 122 described earlier and herein. Certain system condition parameters that characterize various system conditions 238 pertaining to the computing system are determined and recorded (step 220). As indicated by path 230, the operation of determining (e.g., measuring) and recording the system condition parameters is a continuous operation.

The throttling rules are applied to the then-current system conditions to determine a throttling level to assign to the logging processes or to the non-logging processes (step 240). For example, throttling rules 122 might be applied to the instances of system condition parameters that describe the then-current system conditions to determine the throttling level. The execution of the logging processes and any non-logging processes is scheduled in accordance with the throttling level (step 250). In some cases, the throttling level might be consulted merely when scheduling the logging processes, while the non-logging processes are scheduled without consideration of any throttling levels. The scheduled instances of the logging processes and/or non-logging processes are then executed at the computing system (step 260). As indicated by path 270, the operations pertaining to throttling logging processes based at least in part on the then-current system conditions are ongoing operations. As such, the herein disclosed techniques facilitate throttling of processes in a manner that is responsive to the then-current system conditions.

As used herein, the term "process" refers to any entity that can be executed by an instruction processor. In some environments, an executable entity is embodied in a particular operating system that supports any or all of, processes, threads, service routines, system calls, I/O calls, etc. As such, any executable entity that can be deemed to be classified as pertaining to logging operations, and any executable entity that can be deemed to be classified as pertaining to non-logging operations can be subjected to throttling levels in accordance with any of the herein-described embodiments. Moreover, in some systems, certain executable entities such as executable instructions within an interrupt service routine cannot themselves be throttled, however, in those situations, a different set of instructions such as a calling routine or task or thread or process can be throttled rather than the non-throttleable executable entity.

One embodiment of a system, data flows, and data structures for implementing the process throttling technique 200 and/or other herein disclosed techniques is disclosed as follows.

Figure 3:
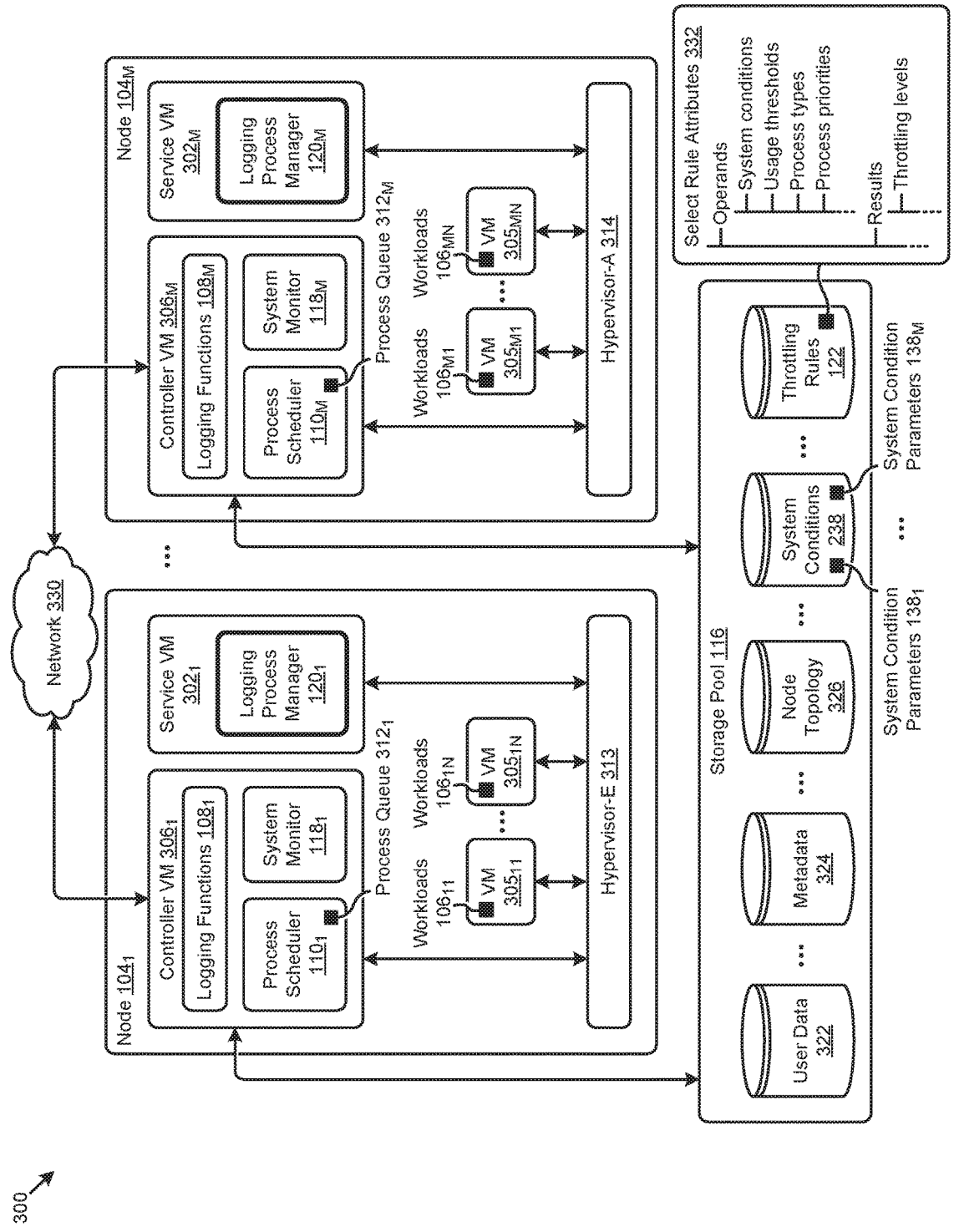
FIG. 3 is a block diagram of a system that implements throttling of logging processes in distributed computing systems, according to an embodiment.

FIG. 3 is a block diagram of a system 300 that implements throttling of logging processes in distributed computing systems. As an option, one or more variations of system 300 or any aspect thereof may be implemented in the context of the architecture and functionality of the embodiments described herein. The system 300 or any aspect thereof may be implemented in any environment.

FIG. 3 illustrates certain aspects pertaining to scheduling logging processes in accordance with corresponding throttling levels that are determined from the then-current computing system conditions. Specifically, the figure is being presented to show one embodiment of certain representative components and associated data flows that describes how the herein disclosed techniques might be implemented in a modern computing system (e.g., virtualization computing system). The components and data flows shown in FIG. 3 present one partitioning and associated data manipulation approach. The specific example shown is purely exemplary, and other subsystems, data structures, and/or partitioning are reasonable.

As shown in FIG. 3, the system 300 comprises two representative nodes (e.g., node $104_1$, . . . , node $104_M$) that have multiple tiers of storage in a storage pool 116. Each node can be associated with one server, multiple servers, or portions of a server. The nodes can be associated (e.g., logically and/or physically) with one or more computing clusters. The multiple tiers of storage of storage pool 116 can include instances of local storage. For example, the local storage can be within or directly attached to a server and/or appliance associated with the nodes. Such local storage can include solid state drives (SSDs), hard disk drives (HDDs), and/or other storage devices. In some embodiments, the multiple tiers of storage can include storage that is accessible through a network 330, such as a networked storage (e.g., a storage area network or SAN, network attached storage or NAS, etc.).

As shown, any of the nodes of system 300 can implement one or more virtualized entities, such as virtual machines (e.g., VM $305_{11}$, . . . , VM $305_{1N}$, VM $305_{M1}$, . . . , VM $305_{MN}$, controller VM $306_1$, . . . , controller VM $306_M$, service VM $302_1$, . . . , service VM $302_M$) and/or executable containers. The VMs can be characterized as software-based computing "machines" implemented in a hypervisor-assisted virtualization environment that emulates the underlying computing resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by one of a variety of heterogeneous hypervisors (e.g., hypervisor-E 313, hypervisor-A 314, etc.), which hypervisors are logically located between the various guest operating systems of the VMs and the host operating system of the physical infrastructure (e.g., the nodes).

As an alternative, executable containers may be implemented at the nodes in an operating system-based virtualization environment or container virtualization environment. The executable containers are implemented at the nodes in an operating system virtualization environment or container virtualization environment. The executable containers comprise groups of processes and/or computing resources (e.g., memory, CPU, disk, etc.) that are isolated from the node host computer and other containers. Such executable containers directly interface with the kernel of the host operating system without, in most cases, a hypervisor layer. This lightweight implementation can facilitate efficient distribution of certain software components, such as applications or services (e.g., micro-services). Any node of system 300 can implement both a hypervisor-assisted virtualization environment and a container virtualization environment for various purposes.

Furthermore, any node in system 300 can implement a virtualized controller to facilitate, at least in part, access to storage facilities (e.g., storage pool 116, networked storage, etc.) by the VMs and/or the executable containers operating at the node. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor). As can be observed in system 300, an instance of a virtual machine (e.g., controller VM $306_1$ and controller VM $306_M$) at each node is used as a virtualized controller to, at least in part, manage storage and input/output (I/O or IO) operations (e.g., to and from storage pool 116) at the nodes. The controller VMs of the nodes in system 300 interact using communications over network 330.

The virtualized entities at the nodes of system 300 can interface with the controller VM of the node through a respective hypervisor. In such cases, the controller VM is not formed as part of specific implementations of a given hypervisor. Instead, the controller VM can run as a virtual machine above the hypervisor at the various nodes. When the controller VMs run above the hypervisors, varying virtual machine architectures and/or hypervisors can operate with the system 300. For example, a hypervisor (e.g., hypervisor-E 313) at one node might correspond to software from a first vendor (e.g., VMware), and a hypervisor (e.g., hypervisor-A 314) at another node might correspond to a second software vendor (e.g., Nutanix). As another virtualized controller implementation example, executable containers (e.g., Docker containers) can be used to implement a virtualized controller in an operating system virtualization environment at a given node. In this case, for example, the virtualized entities at a particular node can interface with a controller container through a hypervisor and/or the kernel of the host operating system of the node. Such interactions between the virtualized entities and controllers at the nodes often pertain to various instances (e.g., replicated instances) of user data 322 and metadata 324 that are distributed over the storage pool 116 to facilitate certain workloads (e.g., workloads $106_{11}$, . . . , workloads $106_{1N}$, . . . , workloads $106_{M1}$, . . . , workloads $106_{MN}$) performed at virtualized entities.

To schedule the processes (e.g., jobs, tasks, etc.) associated with the foregoing workloads at the virtualized entities, an instance of a process scheduler (e.g., process scheduler $110_1$, . . . , process scheduler $110_M$) is implemented in the virtualized controller of each node. The process schedulers handle such workload processes and other processes associated with system 300. Specifically, the process schedulers will schedule logging processes invoked by certain logging functions (e.g., logging functions $108_1$, . . . , logging functions $108_M$) performed at the virtualized controllers and/or other virtualized entities and/or physical entities of system 300. As merely representative examples, such logging functions might perform logging of information pertaining to storage IO operations, networking IO operations, garbage collection operations, metadata management operations, data replication operations, system status (e.g., health) monitoring operations, and/or other operations. In the shown embodiment, the process schedulers access respective process queues (e.g., process queue $312_1$, . . . , process queue $312_M$) to manage the execution priority and order of scheduled processes. System monitors (e.g., system monitor $118_1$, . . . , system monitor $118_M$) might be implemented at the virtualized controllers to facilitate tracking (e.g., measuring, sensing, detecting, translating, etc.) and recording of various system condition parameters associated with system 300.

Other components are implemented in system 300 to facilitate the herein disclosed techniques. Specifically, instances of a logging process manager (e.g., logging process manager $120_1$, . . . , logging process manager $120_M$) are implemented in respective instances of a service VM (e.g., service VM $302_1$, . . . , service VM $302_M$) at each node. As earlier described, each logging process manager at a particular node applies a set of throttling rules to a then-current set of system conditions for the node to determine at least one throttling level for the logging processes at the node. In some cases, a set of node topology information might be accessed to facilitate determination of the throttling level. As can be observed, the throttling rules 122, the system conditions 238, and the node topology 326 can be accessed at storage pool 116. The system conditions 238 storage facility might store the node-specific system condition parameters (e.g., system condition parameters $138_1$, . . . , system conditions parameters $138_M$) for the nodes (e.g., node $104_1$, . . . , node $104_M$) in system 300.

As indicated by a set of select rule attributes 332, the operands of throttling rules 122 might comprise parameters associated with system conditions (e.g., from system conditions 238), usage thresholds (e.g., a high and low threshold for each computing resource type), process types (e.g., logging, non-logging, workload, etc.), process priorities (e.g., mission critical, non-mission critical, etc.), and/or aspects of system 300. As further shown in select rule attributes 332, the evaluation of throttling rules 122 might yield results that pertain to throttling levels (e.g., low, medium, high, reduced, balanced, accelerated, etc.) and/or parameters to facilitate throttling of logging processes and/or other processes in accordance with the herein disclosed techniques.

The foregoing discussions include techniques for applying throttling rules the then-current system conditions to determine throttling levels (e.g., step 240 of FIG. 2), which techniques are disclosed in further detail as follows.

Figure 4:
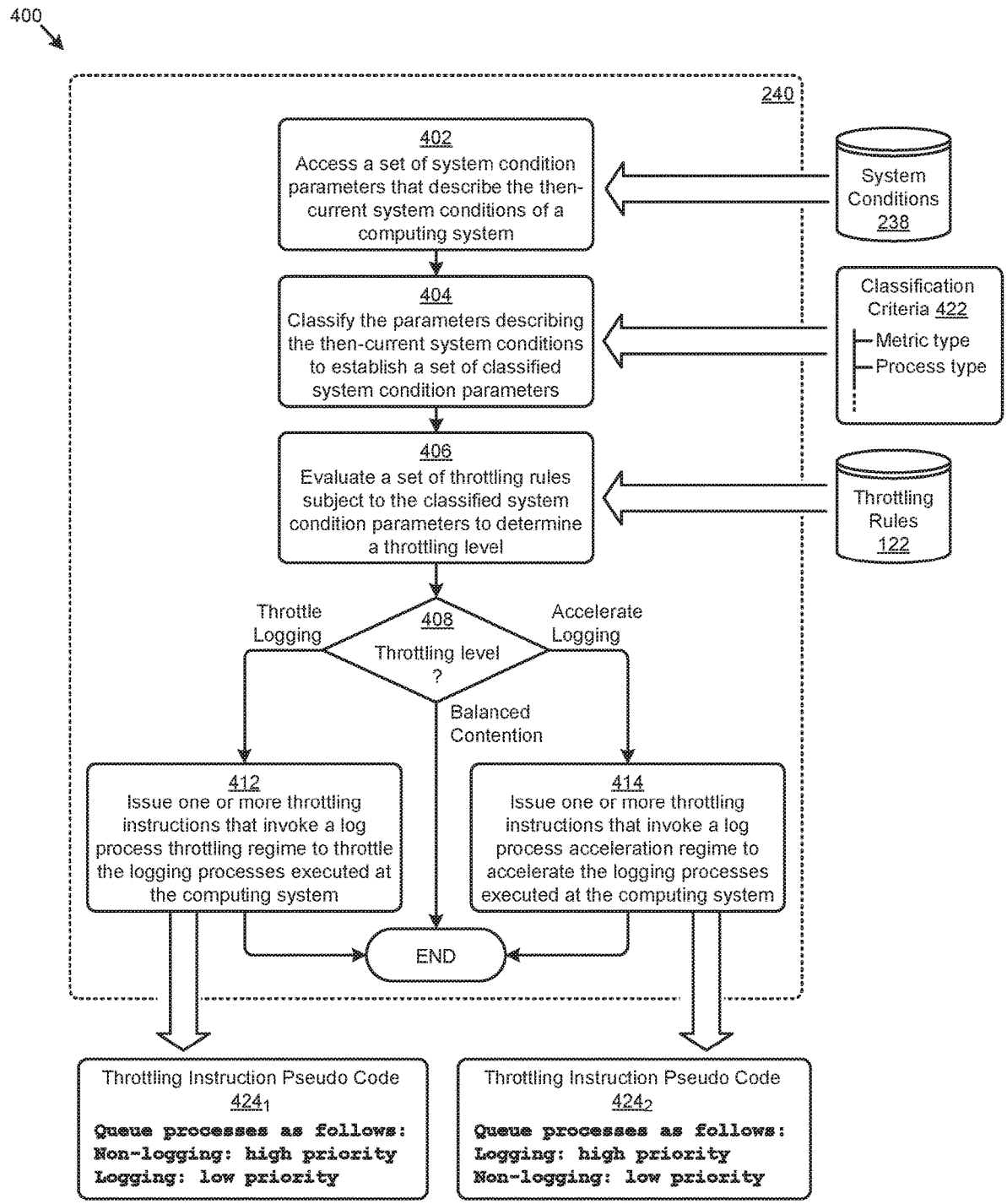
FIG. 4 presents a throttling level selection technique as implemented in systems that facilitate throttling of logging processes in distributed computing systems, according to an embodiment.

FIG. 4 presents a throttling level selection technique 400 as implemented in systems that facilitate throttling of logging processes in distributed computing systems. As an option, one or more variations of throttling level selection technique 400 or any aspect thereof may be implemented in the context of the architecture and functionality of the embodiments described herein. The throttling level selection technique 400 or any aspect thereof may be implemented in any environment.

FIG. 4 illustrates certain aspects pertaining to scheduling logging processes in accordance with corresponding throttling levels that are determined from the then-current computing system conditions. Specifically, the figure is presented to illustrate one embodiment of certain steps and/or operations that facilitate selection of throttling levels based at least in part on throttling rules and/or then-current system conditions. Certain system components and data structures are also depicted in the figure to further describe certain aspects of the throttling level selection technique 400.

As shown, the throttling level selection technique 400 can commence by accessing a set of system condition parameters that describe the then-current system conditions of a computing system (step 402). As illustrated, such system condition parameters might be accessed at system conditions 238 earlier described. The parameters are classified to establish a set of classified system condition parameters (step 404). As indicated in a set of classification criteria 422, the system condition parameters might be classified by metric type (e.g., aggregate resource utilization, CPU utilization, memory utilization, etc.), by process type (e.g., logging, non-logging, workload, etc.), and/or by other criterion. A set of throttling rules (e.g., throttling rules 122) are then evaluated subject to the classified system condition parameters to determine a throttling level (step 406).

If the determined throttling level indicates no throttling is required (see "Balanced Contention" path of decision 408), then no action is taken. In some cases, an action to remove earlier applied throttling levels might need to be taken. If the determined throttling level indicates a reduced throttling is required (see "Throttle Logging" path of decision 408), then one or more throttling instructions are issued (e.g., to a process scheduler) to apply a throttling mechanism to the logging processes at the computing system (step 412). However, if the determined throttling level indicates that accelerated throttling is needed (see "Accelerate Logging" path of decision 408), then one or more throttling instructions are issued (e.g., to a process scheduler) to prioritize or otherwise accelerate the logging processes at the computing system (step 414).

In one scenario for accelerated logging, the throttling instructions inform a process scheduler (e.g., process scheduler 110 of FIG. 1) of relative execution priorities between the logging and the non-logging processes. In another scenario for accelerated logging, the throttling instructions inform a process scheduler to place the processes into queues (e.g., a higher priority queue, a lower priority queue, etc.) that correspond to relative execution priorities between the logging and the non-logging processes. In yet another scenario, a relatively larger number of tokens are offered to the logging processes while a relatively smaller number of tokens are offered to non-logging processes. The determination of a relative importance of a logging process can be performed independently from determination of relative importance of a non-logging process. As such, in some cases a particular logging process from a set of logging process can have a relatively higher importance than a particular process from a set of non-logging processes, while as the same time, a different particular logging process from the set of logging process can have a relatively lower importance than a different particular process from the set of non-logging processes, As an illustration, in any given system there can be many logging activities, some of which logging activities are relatively important, or even mission critical, whereas other logging activities might be assigned to a lower or even much lower importance. The same can said about non-logging activities, specifically, in any system there can be many non-logging activities, some of which non-logging activities are relatively important, or even mission critical, whereas other non-logging activities might be of a lower or even much lower importance.

Strictly as examples, a set of logging activities might be divided into a first set of high-priority, mission-critical logging processes (e.g., for handling logging of disaster recovery I/O, and/or for handling metadata processing), whereas other logging processes of the logging activities might be of significantly lower priority (e.g., garbage collection logging). The same notion can pertain to non-logging activities: A set of non-logging activities might be divided into a first set of high-priority, mission-critical non-logging processes (e.g., for handling performance of disaster recovery I/O, and/or for handling operating system services), whereas other non-logging processes of the non-logging activities might be of significantly lower priority (e.g., printer daemons, batch or background tasks, etc.).

As such, various mechanisms for causing or removing throttling are possible. As examples, an I/O throttle can be applied to forcibly reduce resource consumption, or a log process can be granted a higher priority for accelerated execution, or the processes can enter into a regime that balances resource consumption by any processes based on demand and then-current resource contention. In one specific embodiment, throttling and/or acceleration is achieved by appropriate placement of processes into multi-level processing queues of varying respective priorities. Example throttling instructions as may apply to the foregoing embodiment are represented by throttling instruction pseudo code $424_1$ and throttling instruction pseudo code $424_2$. Specifically, the throttling instructions can include explicit specification of a particular priority queue (e.g., "high priority", "low priority", etc.) in which processes of a certain type (e.g., "Logging", "Non-logging", etc.) are to be placed.

When throttling instructions specifying a throttling level have been issued, techniques discussed herein for scheduling processes according to the throttling level (e.g., step 250 of FIG. 2) can be applied, which techniques are disclosed in further detail as follows.

Figure 5:
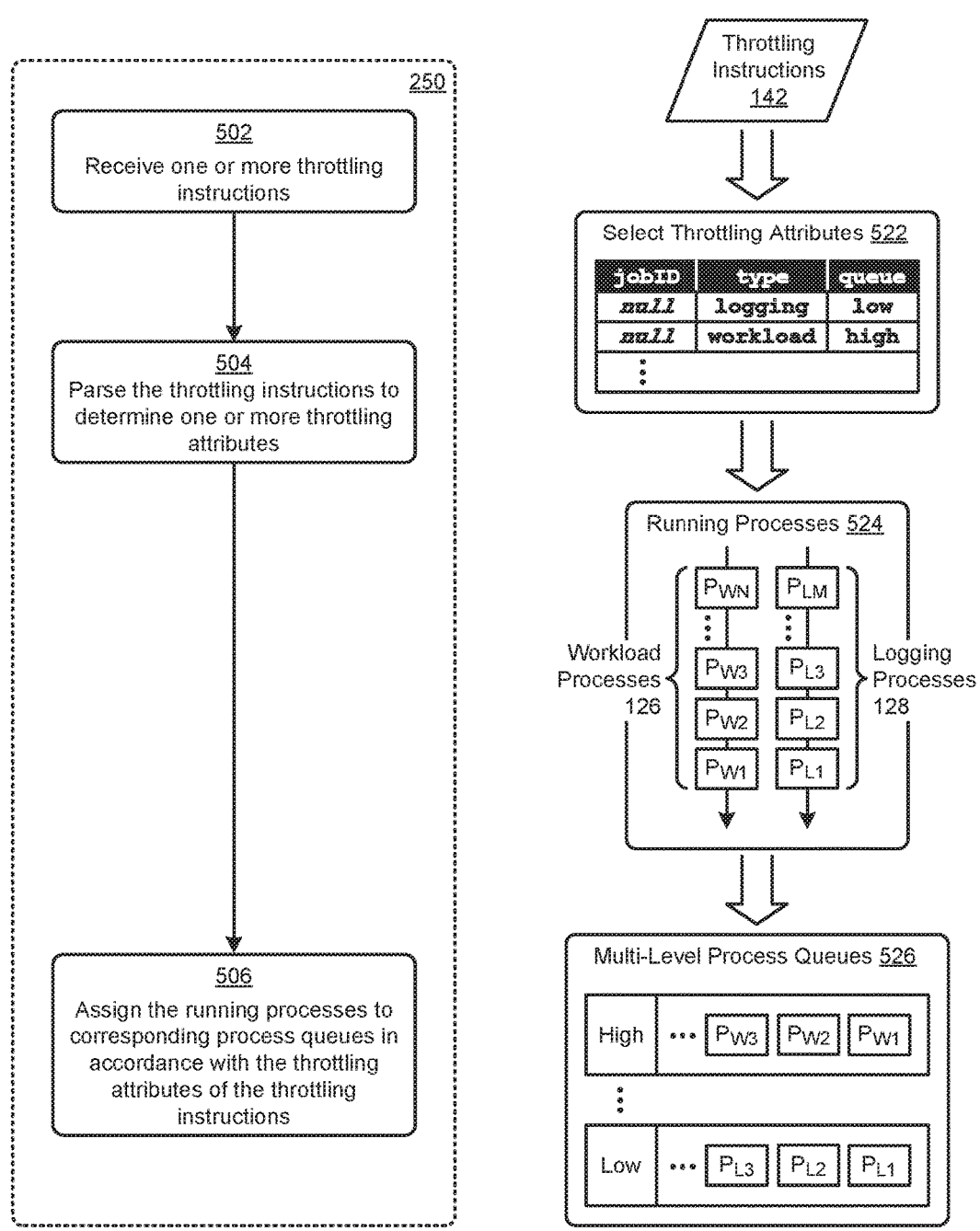
FIG. 5 presents a process scheduling technique as implemented in systems that facilitate throttling of logging processes in distributed computing systems, according to an embodiment.

FIG. 5 presents a process scheduling technique 500 as implemented in systems that facilitate throttling of logging processes in distributed computing systems. As an option, one or more variations of process scheduling technique 500 or any aspect thereof may be implemented in the context of the architecture and functionality of the embodiments described herein. The process scheduling technique 500 or any aspect thereof may be implemented in any environment.

FIG. 5 illustrates certain aspects pertaining to scheduling logging processes in accordance with corresponding throttling levels that are determined from then-current computing system conditions. Specifically, the figure is presented to illustrate one embodiment of certain steps and/or operations that facilitate scheduling of processes according to one or more throttling levels. A representative scenario is also shown in the figure to illustrate an example application of the process scheduling technique 500.

As shown, the process scheduling technique 500 can commence by receiving one or more throttling instructions (step 502). For example, a one or more instances of throttling instructions 142 might be received from a logging process manager by a process scheduler. The throttling instructions are parsed to determine one or more throttling attributes (step 504). As depicted in a set of select throttling attributes 522, one or more of the throttling instructions might describe a job identifier (e.g., stored in a "jobID" field), a process type (e.g., stored in a "type" field), a queue priority (e.g., stored in a "queue" field), and/or other attributes. In this case, a queue priority of "low" or "high" might correspond to a throttling level of reduced or accelerated, respectively. Furthermore, a "jobID" might be "null" when a throttling level is to be applied to all processes of a certain type rather than applied to a particular job or process.

Each of the running processes are then assigned to respective process queues in accordance with the throttling attributes (step 506). As shown in the example, the logging processes 128 and workload processes 126 comprise a set of running processes 524 that are assigned to a "Low" queue and a "High" queue, respectively, in a set of multi-level process queues 526 according to the select throttling attributes 522 derived from throttling instructions 142.

The embodiment of FIG. 5 merely presents one throttling mechanism for applying the throttling level as determined by the herein disclosed techniques to logging processes and/or other processes. Other throttling mechanisms are possible. For example, another throttling mechanism might assign to a particular process and/or group of processes (e.g., of a particular process type) one or more computing resource usage constraints that correspond to a determined throttling level. More specifically, if a process with no throttling or balanced throttling consumes 500 storage IOs per second, applying a reduced throttling level to the process might constrain the number of storage IOs per second consumed by the process to 250.

Additional Embodiments of the Disclosure

Additional Practical Application Examples

Figure 6:
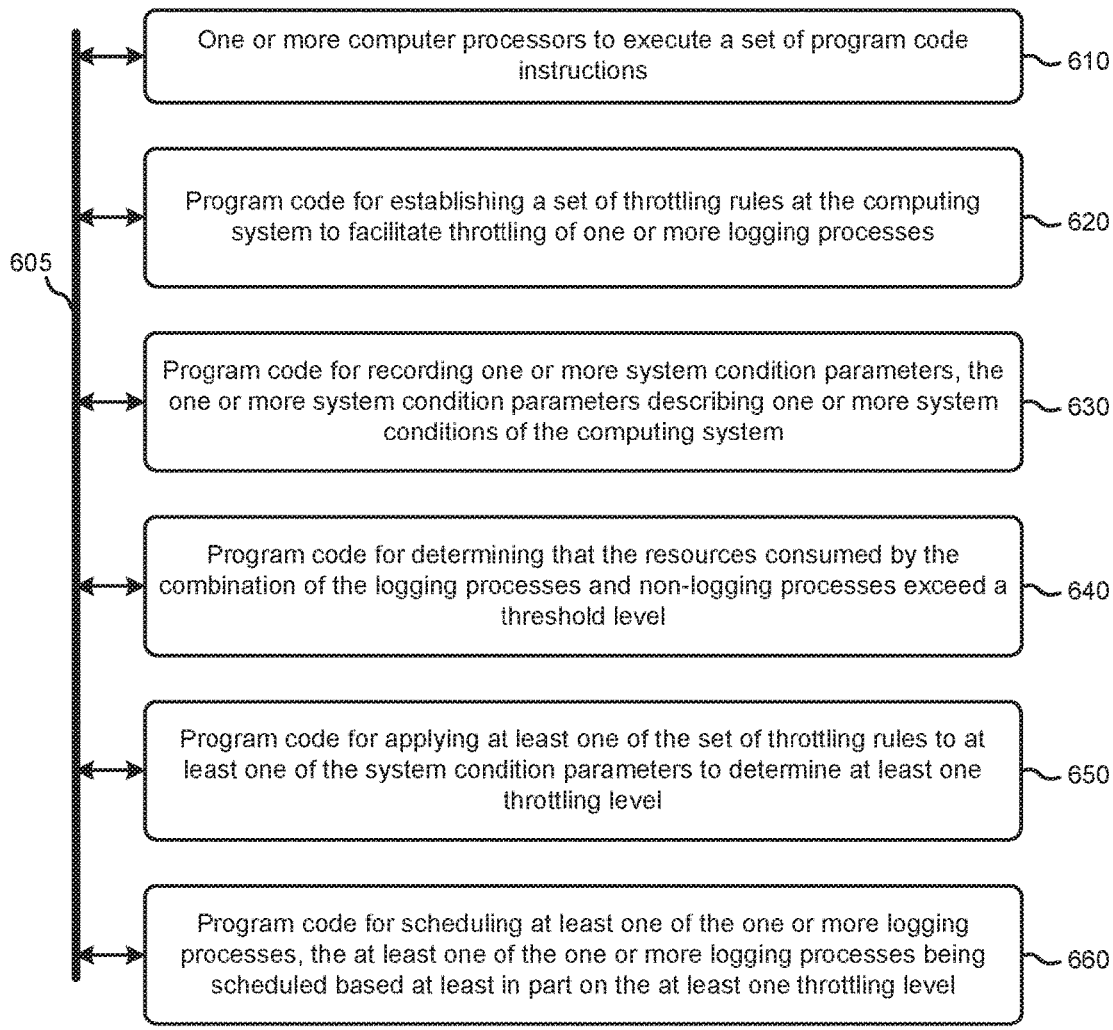
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually or as combined, serve to form improved technological processes that address computing resource starvation of non-logging processes due to computing resource consumption by logging processes. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment.

The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising one or more computer processors to execute a set of program code instructions (module 610) and modules for accessing memory to hold program code instructions to perform:

establishing a set of throttling rules at the computing system to facilitate throttling of one or more logging processes (module 620); recording one or more system condition parameters, the one or more system condition parameters describing one or more system conditions of the computing system (module 630); determining that the resources consumed by the combination of the logging processes and non-logging processes exceed a threshold level (module 640); applying at least one of the set of throttling rules to at least one of the system condition parameters to determine at least one throttling level (module 650); and scheduling at least one of the one or more logging processes, the at least one of the one or more logging processes being scheduled based at least in part on the at least one throttling level (module 660).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 7A:
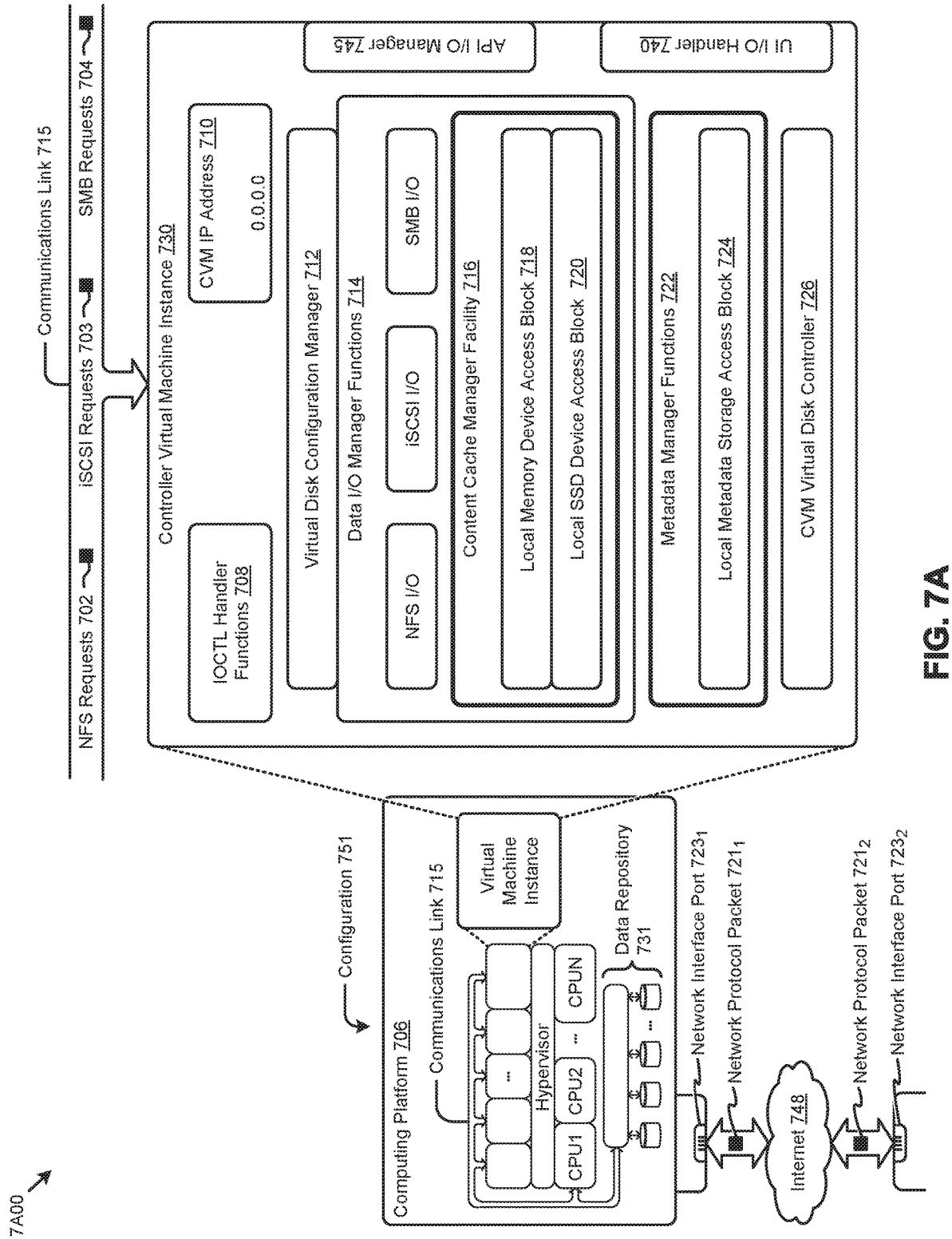
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 7231 and network interface port 7232). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 7211 and network protocol packet 7212).

Computing platform 706 may transmit and receive messages that can be composed of configuration data and/or any other forms of data and/or instructions organized into a data structure (e.g., communications packets). In some cases, the data structure includes program code instructions (e.g., application code) communicated through the Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or the results of executing program code can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to throttling of logging processes in distributed computing systems. In some embodiments, a module may include one or more state machines and/or combinational logic used to implement or facilitate the operational and/or performance characteristics pertaining to throttling of logging processes in distributed computing systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of throttling of logging processes in distributed computing systems). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to throttling of logging processes in distributed computing systems, and/or for improving the way data is manipulated when performing computerized operations pertaining to scheduling logging processes in accordance with corresponding throttling levels that are determined from the then-current computing system conditions.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
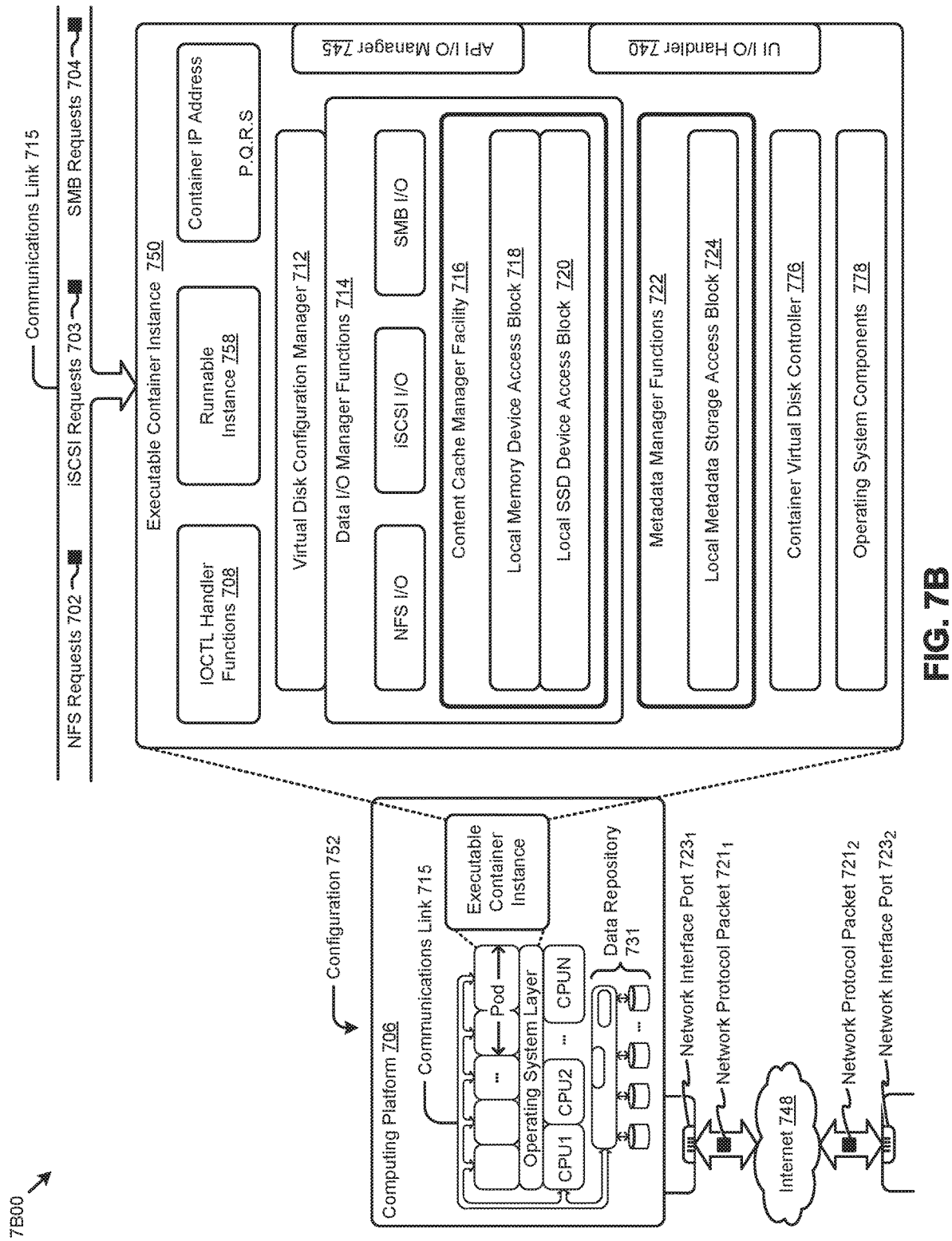

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
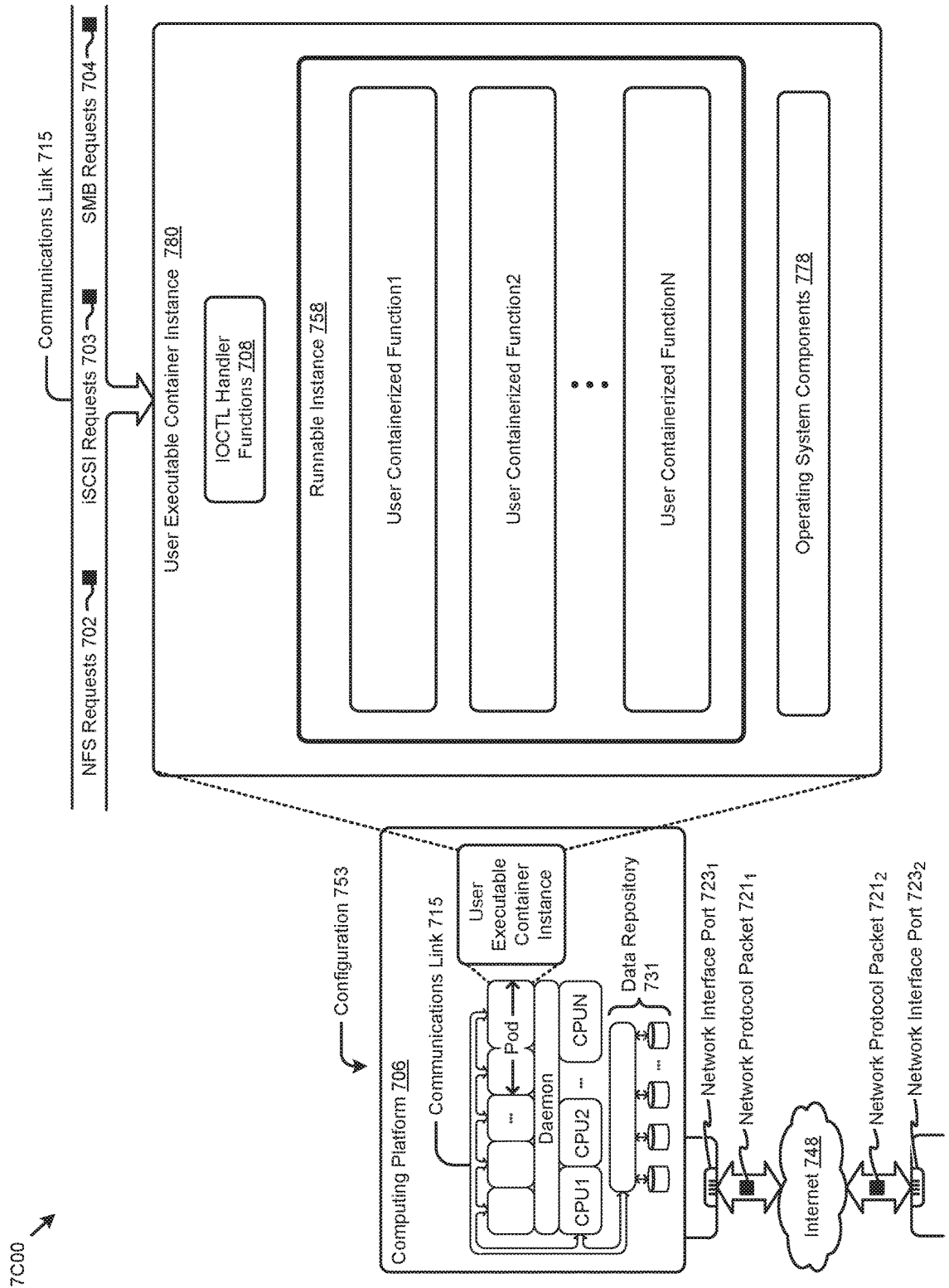

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    recording a system condition parameter, the system condition parameter describing a system condition of a computing system, wherein the system condition parameter is part of a set of system condition parameters, and the set of system condition parameters are classified according to a set of classification criteria to establish a set of classified system condition parameters;
    determining, based at least in part on an event and a comparison of the system condition parameter to a threshold that one of either a logging process or a non-logging process is subject to throttling;
    comparing an importance of the logging process to an importance of the non-logging process to determine whether to throttle the logging process or to throttle the non-logging process;

applying a throttling rule to the set of classification system condition parameters to determine a throttling level; and scheduling the logging process and the non-logging process, the scheduling of the logging process and the non-logging process is based on said comparing, and wherein only one of the logging process or the non-logging process is throttled at the throttling level.

2. The method of claim 1, wherein the determining that either the logging process or the non-logging process is subject to throttling is based at least in part on an event.

3. The method of claim 1, wherein the logging process is invoked by a virtualized controller.

4. The method of claim 1, further comprising:
scheduling the non-logging process into a queue.

5. The method of claim 4, further comprising:
scheduling the logging process into a queue.

6. The method of claim 5, wherein the non-logging process is a virtual machine or an executable container.

7. The method of claim 1, wherein the throttling level corresponds to a log process throttling regime, or a log process acceleration regime, and wherein the log process throttling regime corresponds to a low priority, the log process acceleration regime corresponds to a high priority, and a another regime corresponds to a medium priority.

8. The method of claim 1, wherein the throttling level is codified in a throttling instruction and is based at least in part on a threshold.

9. A non-transitory computer readable medium having stored thereon a sequence of instructions which, when stored in memory and executed by a processor of a computing system causes the processor to perform a set of acts comprising:
recording a system condition parameter, the system condition parameter describing a system condition of a computing system, wherein the system condition parameter is part of a set of system condition parameters, and the set of system condition parameters are classified according to a set of classification criteria to establish a set of classified system condition parameters;
determining, based at least in part on an event and a comparison of the system condition parameter to a threshold that one of either a logging process or a non-logging process is subject to throttling;
comparing an importance of the logging process to an importance of the non-logging process to determine whether to throttle the logging process or to throttle the non-logging process;
applying a throttling rule to the set of classification system condition parameters to determine a throttling level; and
scheduling the logging process and the non-logging process, the scheduling of the logging process and the non-logging process is based on said comparing, and wherein only one of the logging process or the non-logging process is throttled at the throttling level.

10. The computer readable medium of claim 9, wherein the determining that either the logging process or the non-logging process is subject to throttling is based at least in part on an event.

11. The computer readable medium of claim 9, wherein the logging process is invoked by a virtualized controller.

12. The computer readable medium of claim 9, further comprising instructions which, when stored in memory and executed by the processor causes the processor to perform acts of:
scheduling the non-logging process into a queue.

13. The computer readable medium of claim 12, further comprising instructions which, when stored in memory and executed by the processor causes the processor to perform acts of:
scheduling the logging process into a queue.

14. The computer readable medium of claim 13, wherein the non-logging process is a virtual machine or an executable container.

15. The computer readable medium of claim 9, wherein the throttling level corresponds to a log process throttling regime, or a log process acceleration regime, and wherein the log process throttling regime corresponds to a low priority, the log process acceleration regime corresponds to a high priority, and a another regime corresponds to a medium priority.

16. The computer readable medium of claim 9, wherein the throttling level is codified in a throttling instruction and is based at least in part on a threshold.

17. A system for throttling one or more logging processes that contend for resources that are consumed by non-logging processes the system comprising:
a storage medium having stored thereon a sequence of instructions; and
a processor that execute the sequence of instructions to cause the processor to perform a set of acts comprising:
recording a system condition parameter, the system condition parameter describing a system condition of a computing system, wherein the system condition parameter is part of a set of system condition parameters, and the set of system condition parameters are classified according to a set of classification criteria to establish a set of classified system condition parameters;
determining, based at least in part on an event and a comparison of the system condition parameter to a threshold that one of either a logging process or a non-logging process is subject to throttling;
comparing an importance of the logging process to an importance of the non-logging process to determine whether to throttle the logging process or to throttle the non-logging process;
applying a throttling rule to the set of classification system condition parameters to determine a throttling level; and
scheduling the logging process and the non-logging process, the scheduling of the logging process and the non-logging process is based on said comparing, and wherein only one of the logging process or the non-logging process is throttled at the throttling level.

18. The system of claim 17, wherein the determining that either the logging process or the non-logging process is subject to throttling is based at least in part on an event.

19. The system of claim 17, wherein the logging process is invoked by a virtualized controller.

20. The system of claim 17, further comprising instructions which, when stored in memory and executed by the processor causes the processor to perform acts of:
scheduling the non-logging process into a queue.

21. The system of claim 20, further comprising instructions which, when stored in memory and executed by the processor causes the processor to perform acts of:
scheduling the logging process into a queue.

22. The system of claim 21, wherein the non-logging process is a virtual machine or an executable container.

23. The system of claim 17, wherein the throttling level corresponds to a log process throttling regime, or a log process acceleration regime, and wherein the log process throttling regime corresponds to a low priority, the log process acceleration regime corresponds to a high priority, and another regime corresponds to a medium priority.

24. The system of claim 17, wherein the throttling level is codified in a throttling instruction and is based at least in part on a threshold.

\* \* \* \* \*